April 10, 1956 — R. B. CLENDENIN — 2,741,677
WATER SYSTEM CONTROL SWITCH
Filed July 27, 1954 — 2 Sheets-Sheet 1

INVENTOR.
Robert B. Clendenin
BY Victor J. Evans & Co.
ATTORNEYS

April 10, 1956
R. B. CLENDENIN
2,741,677
WATER SYSTEM CONTROL SWITCH
Filed July 27, 1954
2 Sheets-Sheet 2
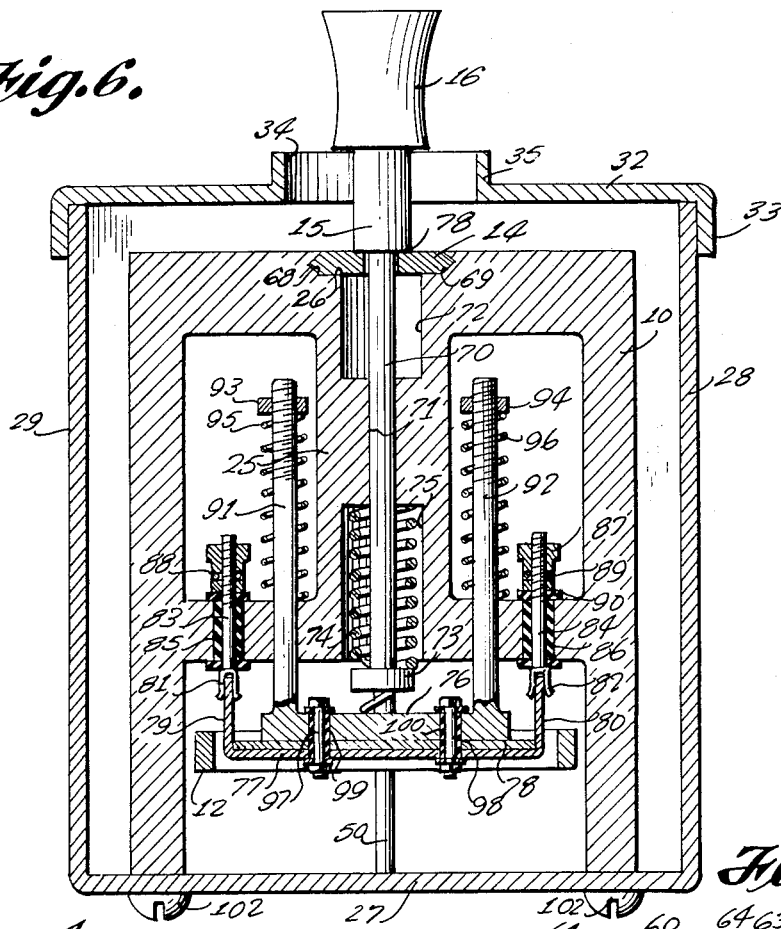
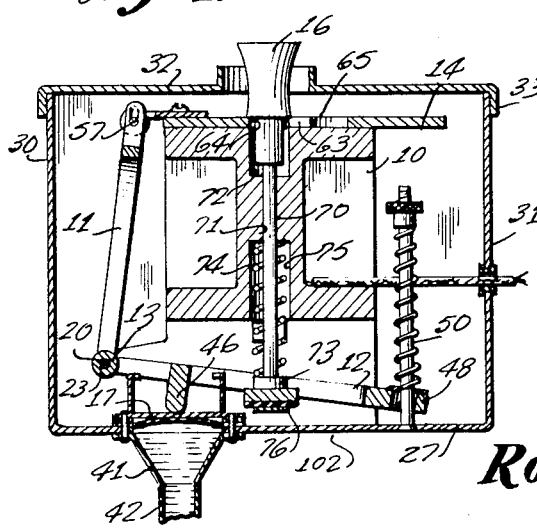
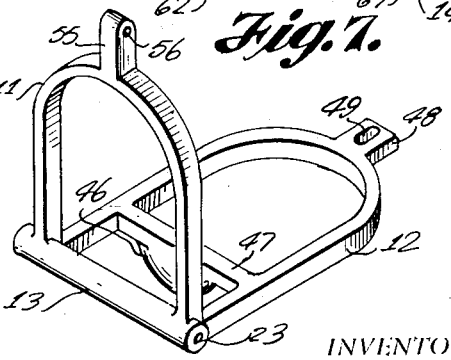
INVENTOR.
Robert B. Clendenin
BY Victor J. Evans & Co.
ATTORNEYS

United States Patent Office 2,741,677
Patented Apr. 10, 1956

2,741,677

WATER SYSTEM CONTROL SWITCH

Robert B. Clendenin, Franklin, Ohio

Application July 27, 1954, Serial No. 445,968

3 Claims. (Cl. 200—83)

This invention relates to safety devices adapted to be automatically operated by pressure of fluid and particularly when the pressure of the fluid drops below a predetermined amount or rises above a predetermined amount, and in particular this invention includes a plurality of contacts actuated by a lower horizontally disposed section of an L-shaped frame with the contacts retained in neutral positions with springs and wherein the device is adapted to be locked with the contacts in the open positions until manually released.

The purpose of this invention is to provide means in a water system for breaking the circuit of an electric pump in the system when the pressure of water in the system drops below a predetermined amount thereby eliminating the necessity of priming the pump in starting and also providing means for preventing damage to water seals of the system which are required to be replaced when a pump for this use runs long periods of time, such as all night, upon failure of the water.

In numerous instances pumps in water systems continue to operate after failure of the water supply and with the system operating without water the water seals are damaged, often to such an extent that new seals are required and upon the return of water to the system priming of the pump is also required. With this thought in mind, this invention contemplates a pressure actuated switch incorporated in a water system whereby upon failure of the water the switch is opened by mechanical means whereby operation of the pump is terminated and wherein upon increase of pressure in the system beyond a predetermined amount the switch is also actuated to break the circuit and stop the pump.

The object of this invention is, therefore, to provide a pressure actuated switch for water systems and the like in which pumps of the system are stopped upon failure of the water and also upon excessive pressure building up in the system.

Another object of the invention is to provide a pressure actuated switch for breaking a circuit to the motor of a pump of a water system in which the switch is locked in two open positions by a spring actuated latch.

A further object of the invention is to provide a pressure actuated switch for making and breaking circuits to pumps of water systems and the like in which the switch is of a comparatively simple and economical construction.

With these and other objects and advantages in view, the invention embodies a substantially rectangular shape block having an L-shaped frame with vertical and horizontal sections pivotally mounted in the ends of arms extended from the block, adapted to be actuated by a pressure influenced diaphragm with springs for urging the frame to a neutral position and with the frame adapted to open contacts in the circuit of a pump motor or the like upon failure of water in a water system or upon pressure in the system building up beyond a predetermined amount.

Other features and advantages of the invention will appear from the following description taken in connection with the drawings, wherein:

Figure 4 is a similar view showing the parts in the position of breaking the circuit when pressure in the system drops below a predetermined amount.

Figure 6 is a cross section through the switch taken on line 6—6 of Fig. 1, illustrating the positions of the contacts with the contacts closed.

Figure 7 is a detail illustrating the L-shaped frame which is pivotally mounted on a block in the housing.

Figure 8 is a detail showing a plan view of a slide that coacts with a stem of a button for retaining the operating parts of the switch in open or released positions.

Figure 1:
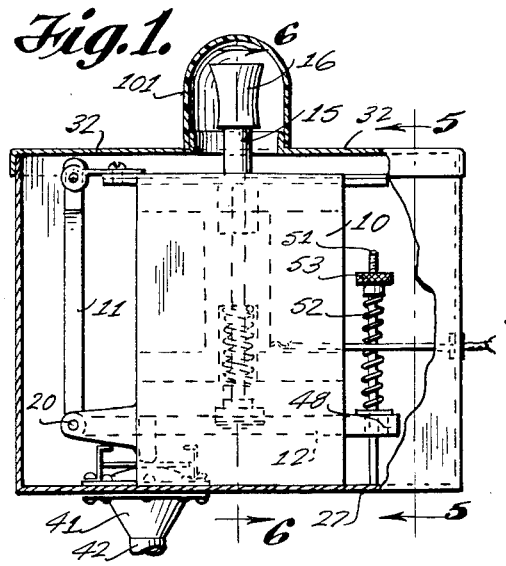
Figure 1 is a side elevational view of the pressure actuated switch with part of the housing broken away showing the operating parts of the switch and showing the switch in a neutral or operative position.
Figure 2:
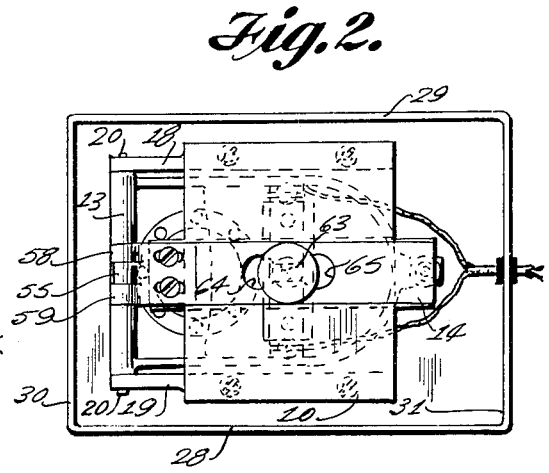
Figure 2 is a plan view of the switch with a cover plate on the upper end thereof omitted.

Referring now to the drawings wherein like reference characters denote corresponding parts, the improved pressure actuated switch of this invention includes a mounting block 10, an L-shaped frame having a vertical section 11 and a horizontal section 12, both of which are carried by a hub 13, a slide 14 adapted to coact with a stem 15 of a button 16, and a diaphragm 17, the parts being positioned to be actuated by suitable springs and other connecting elements.

Figure 9:
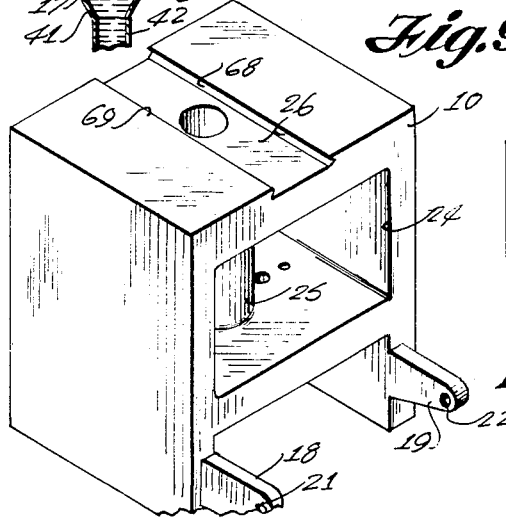
Figure 9 is a view illustrating the block upon which the operating parts of the switch are mounted.

As illustrated in Fig. 9, the block 10 is provided with extended arms 18 and 19 by which the L-shaped frame is pivotally mounted on the block with a pin 20 which extends through openings 21 and 22 and in the arms 18 and 19, respectively, and also through an opening 23 in the hub 13. The block 10 is also provided with an intermediate cavity 24 through which a cylindrical portion 25 extends and the upper end is provided with a longitudinally disposed recess 26 in which the slide 14 is positioned.

The block 10 is positioned in a box-like housing having a base 27, side walls 28 and 29 and end walls 30 and 31. The housing is also provided with a cover 32 having a continuous flange 33 and the cover is provided with an opening 34 in which the button 16 is positioned, the opening 34 being provided with a continuous flange 35.

The diaphragm 17 is positioned in an opening 36 in the base 27 of the housing and the edge is secured by a flange 37 and a gasket 38 against the upper surface of the base with rivets or other fasteners 39 that extend through the base and flange and also through a flange 40 of a funnel shape section 41 of a tube 42 which is connected in a water system. The flange 37 extends from a cup shaped element 43 which is positioned over the diaphragm and a floating plate 44 is secured in the member 43 with an inwardly extended annular flange 45. The diaphragm is positioned whereby the plate 44 is in contact with a projection 46 extended from a rib 47 between the arms of the horizontally disposed section 12 of the frame pivotally mounted on the block.

Figure 3:
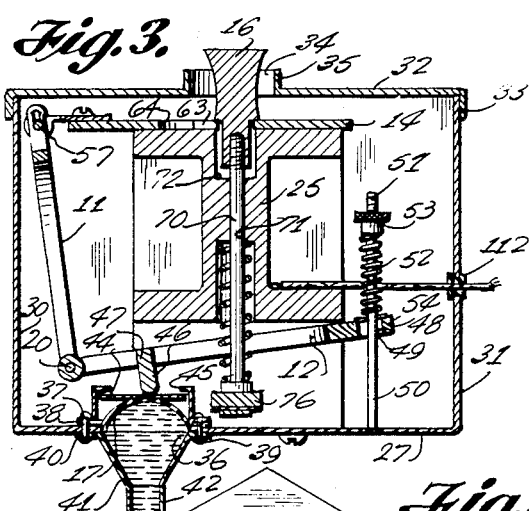
Figure 3 is a longitudinal section through the switch showing the operating parts in the position of breaking the circuit when pressure of the water system builds up beyond a predetermined amount.
Figure 5:
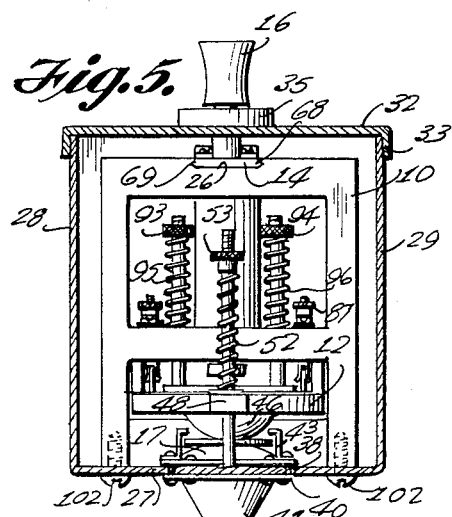
Figure 5 is a cross section through the switch taken on line 5—5 of Fig. 1, also illustrating the parts with a switch in the neutral or operative position.

The section 12 of the L-shaped frame is provided with an extending tab 48 having a slotted opening 49 therein and, as shown in Fig. 3, a rod 50 having a threaded upper end 51 mounted in the base 27 extends through the opening 49, and a spring 52 extended around the rod 50 and positioned between the tab 48 and an adjusting nut 53 threaded on the upper end of the rod 50 provides means for resiliently urging the section 12 of the L-shaped frame downwardly. The nut 53 provides means for adjusting tension of the spring 52 whereby the movement of the L-shaped lever in relation to pressure on the under side of the diaphragm 17 is adapted to be controlled. A washer 54 is positioned on the upper surface of the tab 48 around the rod 50.

The vertically disposed section 11 of the L-shaped frame is also provided with a tab, as indicated by the numeral 55 and the tab 55 is provided with an opening 56 by which the vertical section of the frame is connected to the slide 14 with a pin 57, which extends through hub sections 58 and 59 of a bracket 60 adjustably connected to the slide 14 with screws 61 which extend through slots 62 in the bracket 60.

The slide 14, which is positioned in the recess 26 in the upper end of the block 10 is provided with an intermediate slot 63 having enlarged openings or sockets 64 and 65 at the ends and with the slide positioned in the slot 26 the openings 64 and 65 are positioned to receive the stem 15 of the button 16 when the L-shaped frame is moved from the neutral position shown in Fig. 1 to the extreme position shown in Figs. 3 and 4. The edges of the slide 14 are provided with V-shaped surfaces 66 and 67 that coact with corresponding surfaces or grooves 68 and 69 in the edges of the slot 26.

The stem 15 of the button 16 is threaded on the upper end of a rod 70 which is slidably mounted in a bearing 71 in the portion 25 of the block with the stem 15 adapted to extend into a counterbore 72.

The lower end of the rod 70 is provided with a head 73 and a spring 74 positioned in a counterbore 75 of the section 25 of the block urges the head and rod downwardly, the head being positioned to engage a cross bar 76 upon which a contact arm 77 is carried. The lower end of the stem 15 is provided with a shoulder 78 which, as illustrated in Fig. 6, rides upon the upper surface of the slide 14 with the stem 70 positioned in the slot 63 with the parts in the neutral position shown in Fig. 1, and with an increase of pressure in the water system wherein the diaphragm 17 moves the section 12 of the L-shaped frame upwardly the slide 14 is moved to the position shown in Fig. 3, whereby the stem 15 drops into the opening 65, permitting the spring 74 to urge the head 73 and cross bar 76 downwardly. Upon drop in pressure in the water system the diaphragm permits the section 12 to move downwardly, as shown in Fig. 4, with the slide 14 moving across the upper end of the block 10 whereby the stem 15 drops into the opening 64 in the slide, also permitting the spring 74 to urge the head 73 and cross bar 76 downwardly.

The contact bar 77 is insulated from the cross bar 76 with insulation 78 and upwardly extended ends 79 and 80 of the contact bar 77 are positioned to be received in slots in bifurcated ends 81 and 82 of contact bolts 83 and 84, respectively, which are mounted in insulating bushings 85 and 86 in the block 10. The upper ends of the bolts 83 and 84 are threaded and thumb nuts 87, threaded on the upper ends of the bolts provide means for securing contact wires 88 and 89 against washers 90 positioned on the upper ends of the bolts.

The cross bar 76 is provided with upwardly extended stems 91 and 92 which are slidably mounted in the block 10 and the threaded upper ends of the stems are provided with nuts 93 and 94 which provide means for adjusting tension of springs 95 and 96 extended around the stems.

The contact bar 77 is secured to the cross bar 76 with bolts 97 and 98, the bolts being insulated from the bar 76 with insulating bushings 99 and 100.

The cover plate 32 is provided with a hood 101 of transparent or translucent material, such as plastic, the hood being frictionally held over the flange 35 extended upwardly from the cover 32.

The block 10 is secured upon the base 27 of the housing with screws, such as screws 102, or by other suitable means.

Figure 10:
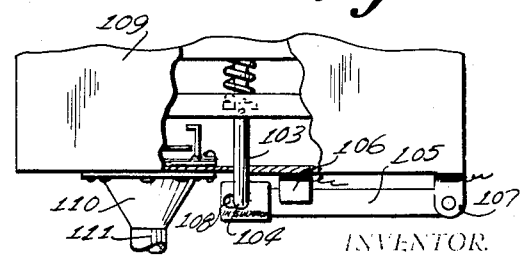
Figure 10 is a detail showing a modification wherein a conventional or knife switch is actuated by a drop in the pressure or by an increase in the pressures above a predetermined amount.

In the design illustrated in Fig. 10 a stem 103, similar to the rod 70, is connected by a pin 104 to a bar 105 of a knife switch having contacts 106 and 107 with the pin 104 extended through a slot 108 and adapted to be actuated by a button, such as the button 16, at the upper end of the rod 103, whereby, with either a drop or increase in the pressure the knife switch is actuated to open a circuit, a wire of which is connected to the contacts 106 and 107. In this design the device is provided with a housing 109 and a diaphragm, similar to the diaphragm 17, is positioned at the upper end of a conical shaped section 110 of a supply connection 111, similar to the connection 42.

In the design shown the wires 88 and 89 extend through a ferrule 112, of insulating material, in the wall 31 of the housing and these wires may be connected to a suitable source of current supply, one of said wires being connected directly to the supply line and the other to terminals of a motor or other operating device for a pump of the system. The button 16 can be pulled up to manually reset the switch and the switch of the present invention serves to shut a pump off when the pressure of the fluid drops or exceeds a predetermined level. Thus, the switch is manually operated when it is to be reset.

It will be understood that other modifications, within the scope of the appended claims, may be made in the design and arrangement of the parts without departing from the spirit of the invention.

What is claimed is:

1. In a pressure actuated switch, the combination which comprises a mounting block, an L-shaped frame having a vertical section and a horizontal section positioned with the horizontal section extended through said block, means for pivotally mounting the frame on the block, a pair of contacts, a contact bar positioned to engage said contacts, a spring actuated rod for moving said bar away from the contacts, resilient means for urging the bar toward the contacts and means, actuated by the vertical section of the L-shaped frame for retaining said contact bar and operating means in operative position, and a diaphragm positioned in a system of fluid under pressure and adapted to actuate said L-shaped frame whereby upon drop of pressure in the system the contact bar actuating means is released to open said contacts and also upon increase in pressure of said system said L-shaped frame is actuated by the diaphragm to release the contact bar operating means and also open said contacts.

2. In a pressure actuated switch, the combination which comprises a mounting block having cavities therein and openings therethrough, an L-shaped frame having a vertically disposed section and a horizontally disposed section positioned with the horizontally disposed section extended through the block, means for pivotally mounting said frame on the block, a vertically disposed rod having a spring thereon extended through the horizontally disposed section of the frame with the spring positioned to urge the horizontally disposed section downwardly, a slide having openings therethrough slidably mounted in said block, means for pivotally connecting the slide to the upper end of the vertically disposed arm of the L-shaped frame, a pair of contacts mounted in the block, a contact bar also mounted in the block and positioned to engage said contacts, stems with springs thereon slidably mounted in the block and connected with a cross bar, means for mounting the said contact bar on said cross bar, a vertically disposed rod having a button on the upper end slidably mounted in the block and extended through the slide, said rod positioned to engage said cross bar for urging the cross bar and contact bar downwardly, resilient means for urging the rod downwardly to actuate the cross bar and contact bar, said slide being adapted to prevent downward movement of the rod until openings thereof are in registering relation with said button, and a diaphragm connected in the fluid system and positioned to actuate the L-shaped frame upon change in pressure of fluid in the system in which the diaphragm is positioned beyond predetermined amounts.

3. In a pressure actuated switch, a mounting bloc, an L-shaped frame including a vertical section and a horizontal section, a hub carrying said sections, a slide, a stem for coaction with said slide and having a button thereon, said block being provided with extended arms having said frame pivotally connected thereto, said block having an intermediate cavity and a longitudinally disposed recess for receiving said slide, a housing surrounding said block and including a base, side walls and end walls, a cover on said housing and provided with an opening for receiving said button, said base having an opening, a diaphragm positioned in said last named opening and having its edge secured adjacent the upper surface of said base, a tube connected to a water system and having a funnel shaped section contiguous to said diaphragm, a cup-shaped element positioned over said diaphragm and having a floating plate secured therein, a rib having a projection arranged in engagement with said plate, the horizontal section of said frame having a tab provided with a slot, a rod extending through said slot, a spring circumposed on said rod, a bracket adjustably connected to said slide, said slide including an intermediate slot having enlarged sockets at the ends thereof, a rod connected to said stem and having a head on its lower end, a cross bar engaged by said head, a contact arm carried by said cross bar, a shoulder on the lower end of said stem for engagement with said slide, a spring for urging said head downwardly, contact bolts for coaction with said contact arm, stems extended upwardly from said cross bar and slidably mounted in said block, and a hood of transparent material in said cover.

References Cited in the file of this patent

UNITED STATES PATENTS

| | | |
|---|---|---|
| 2,231,532 | Grooms | Feb. 11, 1941 |
| 2,608,624 | Goodrich | Aug. 24, 1952 |